(No Model.) 3 Sheets—Sheet 1.
F. W. LEE.
POTATO HARVESTER.
No. 472,370. Patented Apr. 5, 1892.
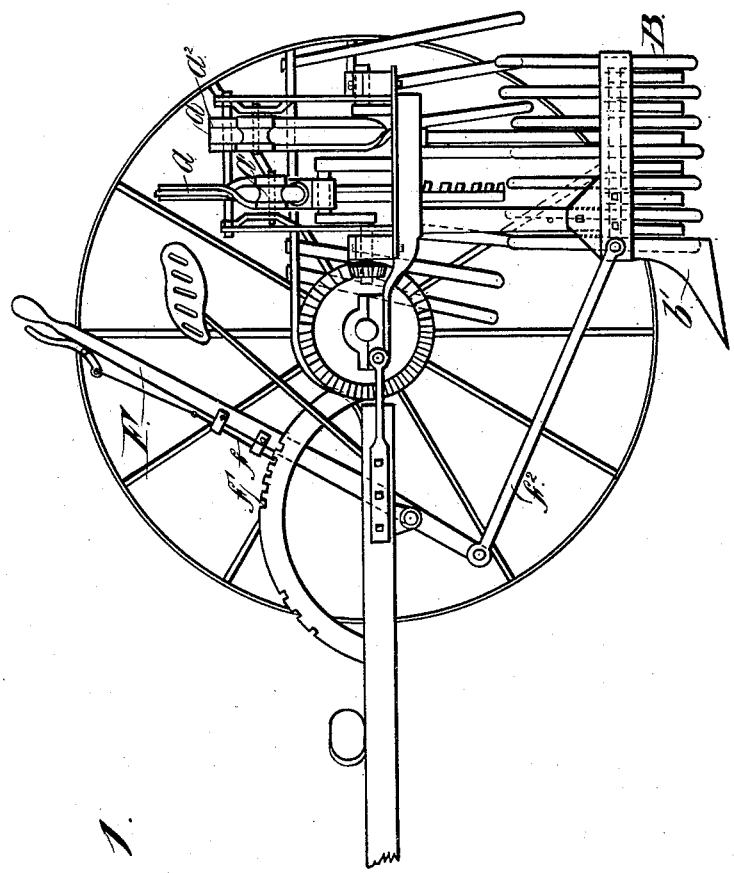
Fig. 1.
Witnesses:
H. G. Dieterich
C. W. Sommers
Inventor:
Francis W. Lee,
By Henry Orth
Atty.

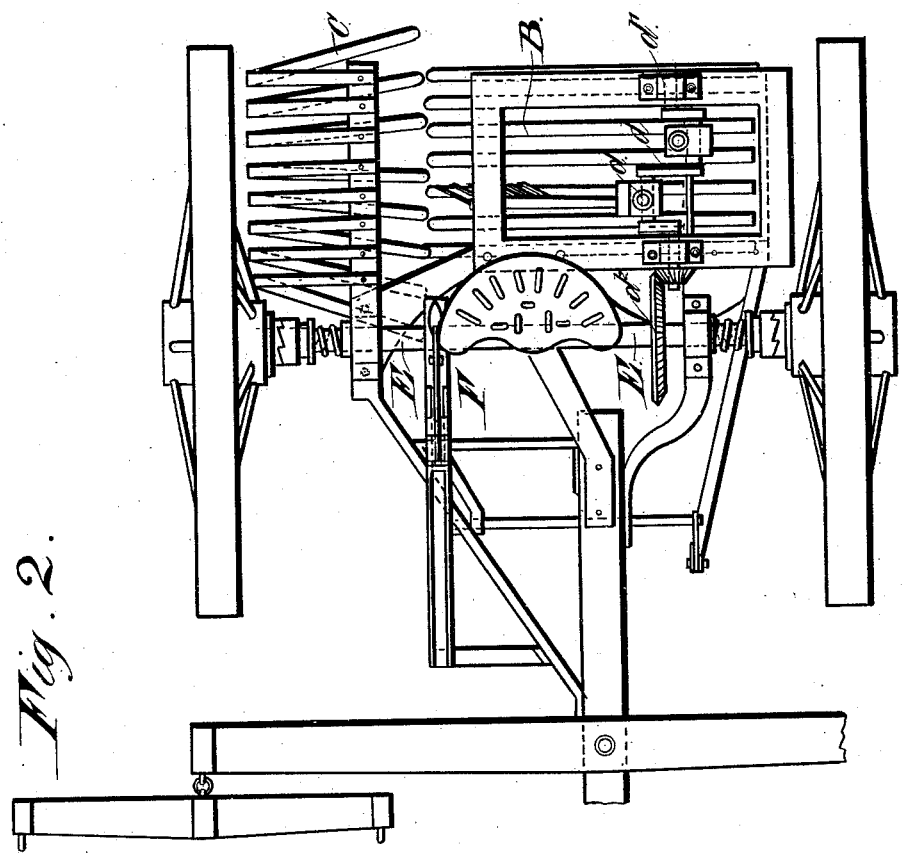

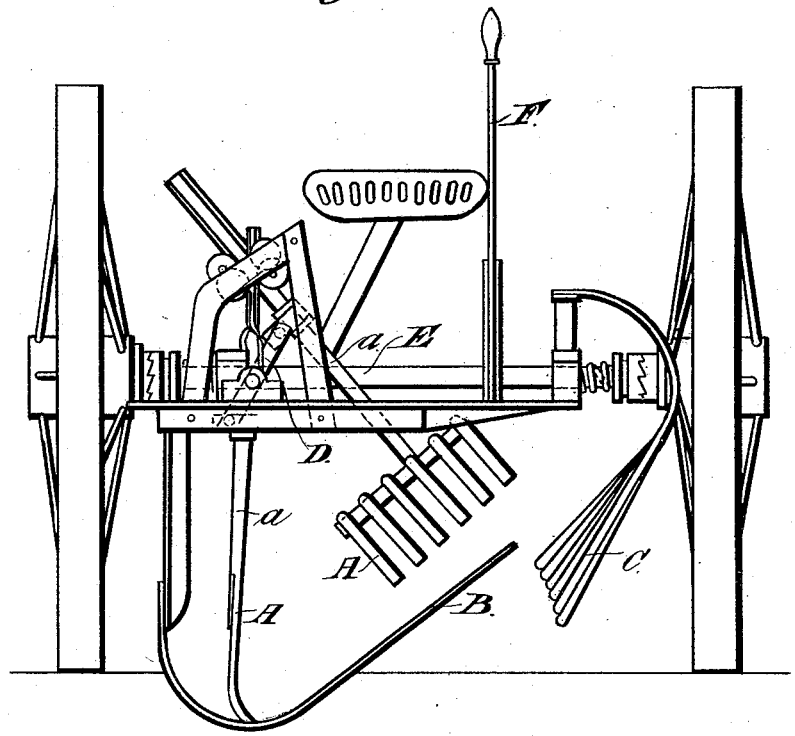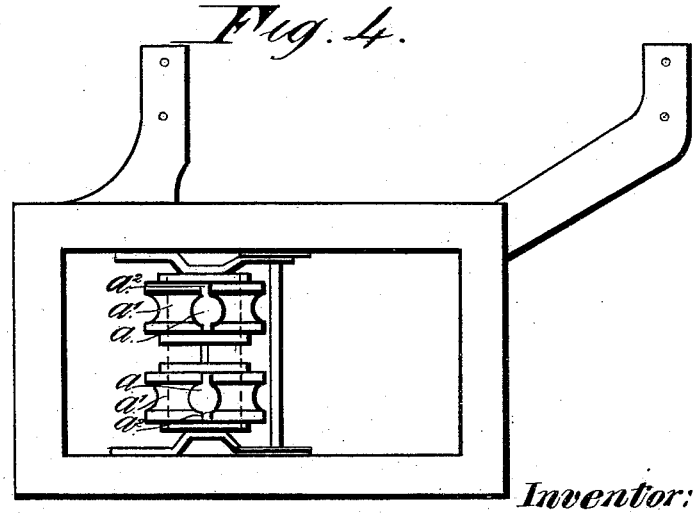

United States Patent Office.

FRANCIS WILLIAM LEE, OF WOODEND, VICTORIA.

POTATO-HARVESTER.

SPECIFICATION forming part of Letters Patent No. 472,370, dated April 5, 1892.

Application filed October 10, 1891. Serial No. 408,317. (No model.)

*To all whom it may concern:*

Be it known that I, FRANCIS WILLIAM LEE, blacksmith, a subject of the Queen of Great Britain, residing at Woodend, in the British Colony of Victoria, have invented an Improved Machine for Digging and Screening Potatoes, of which the following is a specification.

This invention has been devised for the purpose of providing a machine which will raise potatoes out of the ground and deposit them in lines upon the surface without bruising or otherwise injuring them.

The essential feature of this improved machine for digging and screening potatoes consists in the employment of a pair of forks which are alternately turned so that they carry the earth and potatoes up a set of curved inclined bars and discharge the latter onto other inclined bars, whereby they are still further screened and delivered in rows onto the surface of the ground, said forks being automatically turned lengthwise to the machine while traveling upward and crosswise to the machine while traveling downward. These said forks are each provided with an upwardly-projecting stem or arm, whose upper part is formed with two feathers or is made flat and is bent or twisted at a certain distance from the end, so that the fork on its lower end will be automatically turned into the required position at a certain part of the stroke, as will be well understood from the following description, reference being had to the accompanying drawings, wherein—

Figure 1 is a side elevation of my improved potato digging and screening machine, with the near side driving-wheel removed in order to better illustrate the construction of such machine. Fig. 2 is a plan, and Fig. 3 is a rear elevation thereof, while Fig. 4 is a detached plan of the frame or support for that part of the mechanism which automatically turns the forks above referred to into their required positions.

Similar letters of reference indicate the same parts in all the figures.

A A represent the pair of forks, which, as hereinbefore mentioned, carry the potatoes up a set of curved inclined bars B and discharge them onto another set of inclined bars or screen C, down which they fall onto the surface of the ground.

Each of the forks A is provided with an upwardly-projecting stem or arm $a$, which is passed between a pair of guide-rolls $a'$, mounted in bearings upon some fixed part of the machine, and which serve to alternately turn said forks in opposite directions for about a quarter of a revolution—that is, through an angle of ninety degrees—so that when traveling upwardly they will lie in the direction of travel of the implement and when traveling downwardly they will lie across the direction of such travel, so that they will pass each other in their up and down movements. This turn is given to said forks by providing the upper ends of their shanks $a$ with projecting webs or feathers $a^2$, adapted to fit between the flat parts of the guide-rolls $a'$. These said webs or feathers are bent or twisted near their lower ends, so that their main portion projects at right angles to said lower ends.

Each of the forks A is connected by an adjustable block $d$, fixed upon its shank $a$ with a two-throw crank D, which latter is mounted in bearings $d'$ on some fixed part of the framing of the machine, and is driven by bevel-gearing $d^2$ from the main axle E of the machine.

Secured to the same frame-work as the curved bars B in front of the latter is arranged a horizontal plowshare $b'$, which is curved in cross-section somewhat to the same shape as said bars and whose forward end is slightly lower than the level of said bars, said share being arranged at such an incline as that it will raise the earth and potatoes onto the surface of said curved bars B as the machine progresses. When such earth and potatoes reach said bars B, they are subjected to the action of the two forks A, which are continually reciprocated by the rotation of the two-throw crank D and are automatically turned lengthwise of the machine in traveling upward by reason of the webs $a^2$ on their shanks $a$, fitting between the two rollers $a'$. As soon as said forks arrive near the uppermost limit of their strokes the twists in the webs $a^2$, passing between the first guide-rollers $a'$, turn said forks through an angle of about ninety degrees—that is, for about a quarter of a revolution—and keep them in position crosswise to the travel of the machine until the other fork has passed them on its upstroke, when the returning fork will be turned back into its working position—that is, so that it lies in the direction of the travel of the machine. This fork will continue to be lowered by the revolution of its crank and will engage with any earth and potatoes which have been delivered onto the curved bars B, and will then carry the potatoes up said bars and will deliver them onto the inclined bars C at the side, whereby said potatoes will be delivered onto the surface of the ground in a continuous row, the earth being allowed to drop through the bars will be thoroughly removed from said potatoes.

A hand-lever F, fitted with a spring-catch $f$, adapted to engage in a toothed quadrant $f'$, is mounted upon the framing of the implement in a convenient position alongside the driver's seat and is connected by a rod or bar $f^2$ with the framing carrying the plowshare and curved bars B, in order that said share and said bars may be raised from off the surface of the ground when required, the effect of pushing said lever forward being to turn said frame backward upon the axle of the implement.

To enable the depth of cut of the share to be regulated at will, this share is arranged to slide vertically upon the side bars of the framing above referred to and is connected to a screw-threaded rod passing through a correspondingly screw-threaded boss on a lever or hand-wheel, which can be rotated, as required, to raise or lower said share.

Having now particularly described and ascertained the nature of my said invention and in what manner the same is to be performed, I declare that what I claim is—

1. A machine for digging and screening potatoes, having a pair of forks which are turned approximately a quarter of a revolution—that is, through an angle of about ninety degrees—at or near the end of each movement or stroke and which serve to carry the earth and potatoes elevated by the machine up a series of bars or rods, said forks being automatically turned, as just described, so that they can pass each other while the one is on its up and the other on its down stroke, substantially as and for the purposes herein described and explained, and as illustrated in the accompanying drawings.

2. In a machine for digging and screening potatoes, the combination, with a fork formed on or secured to the lower end of a shank or bar, of a pair of guide-rollers mounted in fixed bearings and arranged to work against each side of said shank or bar, the latter being provided with projecting webs or feathers turned or twisted through an angle of about ninety degrees and being, moreover, mounted upon or connected to a crank, the whole being constructed and arranged substantially as and for the purposes herein described and explained, and as illustrated in the accompanying drawings.

3. In a machine for digging and screening potatoes, the combination, with a pair of forks provided with means (such, for instance, as the projecting webs or feathers $a$, working between fixed rollers $a'$) for automatically turning said forks through an angle of about ninety degrees at each stroke or upward and downward movement, of a two-throw crank upon which said forks can be supported, substantially as and for the purposes herein described and explained, and as illustrated in the accompanying drawings.

4. In a machine for digging and screening potatoes, the combination, with a two-throw crank connected to and operating a pair of forks, the latter being provided with means whereby they can be automatically turned approximately a quarter of a revolution—that is, through an angle of about ninety degrees—at each stroke or upward and downward movement, of an axle fitted with land-wheels and connected to said two-throw crank by bevel or other gearing, substantially as and for the purposes herein described and explained, and as illustrated in my drawings.

5. In a machine for digging and screening potatoes, the combination, with a fork provided with means whereby it can be automatically turned for approximately a quarter of a revolution—that is, through an angle of about ninety degrees—at each stroke or upward and downward movement, of a series of curved rods or bars arranged beneath said fork, together with a slightly-inclined plowshare in front of said bars, the whole being constructed and arranged substantially as and for the purposes herein described and explained, and as illustrated in my drawings.

6. In a machine for digging and screening potatoes, the combination, with a series of curved bars preferably arranged transversely to the machine and a series of inclined bars extending down from some fixed part of the framing of the machine to a point slightly below the upper ends of the said first-mentioned curved bars, a space being left between the two sets, of a pair of forks adapted to reciprocate vertically and to revolve intermittingly about their axes and operating to transfer the potatoes from one set of curved bars to the other, substantially as and for the purposes described.

7. In a machine for digging and screening potatoes, the combination, with a fork fitted with means whereby it can be moved up and down and be turned round approximately a quarter of a revolution—that is, through an angle of about ninety degrees—at each stroke, of a series of curved bars, together with a slightly-inclined plowshare $b'$, secured upon a frame and connected with a hand-lever, whereby said frame can be raised or lowered or be adjusted into any desired position, substantially as and for the purposes herein described and explained, and as illustrated in the accompanying drawings.

FRANCIS WILLIAM LEE.

Witnesses:
RICHARD GROOMES,
HERBERT ONIANS.